US012420823B2

(12) United States Patent
Hayakawa et al.

(10) Patent No.: US 12,420,823 B2
(45) Date of Patent: Sep. 23, 2025

(54) VEHICLE

(71) Applicant: SUBARU CORPORATION, Tokyo (JP)

(72) Inventors: Kazuhiro Hayakawa, Tokyo (JP); Ryota Nakamura, Tokyo (JP); Junichi Motoyama, Tokyo (JP); Tsukasa Mikuni, Tokyo (JP); Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 132 days.

(21) Appl. No.: 18/460,828

(22) Filed: Sep. 5, 2023

(65) Prior Publication Data
US 2024/0101139 A1 Mar. 28, 2024

(30) Foreign Application Priority Data
Sep. 27, 2022 (JP) .................. 2022-154270

(51) Int. Cl.
*B60W 50/14* (2020.01)
*G06Q 50/00* (2012.01)

(52) U.S. Cl.
CPC ............. *B60W 50/14* (2013.01); *G06Q 50/01* (2013.01)

(58) Field of Classification Search
CPC ... B60W 50/14; G06Q 50/01; G06Q 30/0269; G08G 1/0962; G08G 1/09; G08G 1/09623; G08G 1/09626; G08G 1/0965; G08G 1/0967; G08G 1/0968; G08G 1/096855; G08G 1/096877; B60Q 3/80; G10L 13/00; G10L 15/02; G10L 15/22; G10L 15/26; G10L 2015/088; G10L 25/54; G06F 16/90332; G06F 16/00; G06F 16/90; G06F 16/903; G06F 16/9032; G06F 16/3329
See application file for complete search history.

(56) References Cited

U.S. PATENT DOCUMENTS

| 2017/0353510 A1* | 12/2017 | Levine | H04L 65/403 |
| 2018/0096699 A1* | 4/2018 | Shintani | B60W 50/08 |
| 2022/0306124 A1* | 9/2022 | Sato | B60W 40/08 |

FOREIGN PATENT DOCUMENTS

JP 2006-195578 A 7/2006

* cited by examiner

*Primary Examiner* — Brian A Zimmerman
*Assistant Examiner* — Anthony D Afrifa-Kyei
(74) *Attorney, Agent, or Firm* — Rimon P.C.

(57) ABSTRACT

A vehicle includes a social media information acquisition unit, a collector, a browsing time acquisition unit, an extractor, and a control processor. The social media information acquisition unit communicates with portable devices of occupants in the vehicle to acquire social media information of the occupants from the portable devices. The collector collects search keywords from the social media information of the occupants. The browsing time acquisition unit acquires information on browsing time for each of the search keywords from the social media information. The extractor extracts a common subject based on the search keywords collected from all of the portable devices of the occupants in a communicable state, and the information on the browsing time. The control processor determines content of a proposal to be provided to the occupants in the vehicle based on the common subject, and notifies the occupants of the content of the proposal.

9 Claims, 8 Drawing Sheets

| PORTABLE DEVICE | SEARCH KEYWORD |
|---|---|
| 10a | TRAVEL TO HOKKAIDO |
| 10a | JAPANESE SAKE |
| 10a | DANCE ARRANGEMENT |
| 10a | ENTERTAINER A |
| 10b | PROFESSIONAL BASEBALL TEAM A |
| 10b | ENTERTAINER A |
| 10b | CAR |
| 10b | TRAVEL |
| 10b | DANCE |

FIG. 2

| PORTABLE DEVICE | SEARCH KEYWORD | VIEWED URL INFORMATION | BROWSING TIME (SEC) |
|---|---|---|---|
| 10a | TRAVEL TO HOKKAIDO | https://www.hokkaidotravel1... | 58 |
| 10a | TRAVEL TO HOKKAIDO | https://www.hokkaidotravel2... | 32 |
| 10a | TRAVEL TO HOKKAIDO | https://www.hokkaidotravel3... | 124 |
| 10a | TRAVEL TO HOKKAIDO | https://www.hokkaidotravel4... | 45 |
| 10a | JAPANESE SAKE | https://www.japanesesake1... | 15 |
| 10a | JAPANESE SAKE | https://www.japanesesake2... | 19 |
| 10a | DANCE ARRANGEMENT | https://www.dancearrangement1... | 149 |
| 10a | DANCE ARRANGEMENT | https://www.dancearrangement2... | 187 |
| 10a | DANCE ARRANGEMENT | https://www.dancearrangement3... | 73 |
| 10a | DANCE ARRANGEMENT | https://www.dancearrangement4... | 214 |
| 10a | ENTERTAINER A | https://www.entertainerA1... | 400 |
| 10a | ENTERTAINER A | https://www.entertainerA2... | 500 |
| 10a | PROFESSIONAL BASEBALL TEAM A | https://www.probaseballteamA... | 20 |
| 10b | ENTERTAINER A | https://www.entertainerA1... | 15 |
| 10b | ENTERTAINER A | https://www.entertainerA2... | 10 |
| 10b | CAR | https://www.car1... | 70 |
| 10b | CAR | https://www.car2... | 80 |
| 10b | CAR | https://www.car3... | 45 |
| 10b | TRAVEL | https://www.travel1... | 90 |
| 10b | TRAVEL | https://www.travel2... | 150 |
| 10b | TRAVEL | https://www.travel3... | 35 |
| 10b | DANCE | https://www.dance1... | 120 |
| 10b | DANCE | https://www.dance2... | 150 |
| 10b | DANCE | https://www.dance3... | 210 |
| 10b | DANCE | https://www.dance4... | 214 |

FIG. 3

| PORTABLE DEVICE | SEARCH KEYWORD | VIEWED URL INFORMATION | BROWSING TIME (SEC) | TOTAL BROWSING TIME (SEC) |
|---|---|---|---|---|
| 10a | TRAVEL TO HOKKAIDO | https://www.hokkaidotravel1... | 58 | 259 |
| 10a | TRAVEL TO HOKKAIDO | https://www.hokkaidotravel2... | 32 | |
| 10a | TRAVEL TO HOKKAIDO | https://www.hokkaidotravel3... | 124 | |
| 10a | TRAVEL TO HOKKAIDO | https://www.hokkaidotravel4... | 45 | |
| 10a | JAPANESE SAKE | https://www.japanesesake1... | 15 | 34 |
| 10a | JAPANESE SAKE | https://www.japanesesake2... | 19 | |
| 10a | DANCE ARRANGEMENT | https://www.dancearrangement1... | 149 | 623 |
| 10a | DANCE ARRANGEMENT | https://www.dancearrangement2... | 187 | |
| 10a | DANCE ARRANGEMENT | https://www.dancearrangement3... | 73 | |
| 10a | DANCE ARRANGEMENT | https://www.dancearrangement4... | 214 | |
| 10a | ENTERTAINER A | https://www.entertainerA1... | 400 | 900 |
| 10a | ENTERTAINER A | https://www.entertainerA2... | 500 | |
| 10a | PROFESSIONAL BASEBALL TEAM A | https://www.probaseballteamA... | 20 | 20 |
| 10b | ENTERTAINER A | https://www.entertainerA1... | 15 | 25 |
| 10b | ENTERTAINER A | https://www.entertainerA2... | 10 | |
| 10b | CAR | https://www.car1... | 70 | 195 |
| 10b | CAR | https://www.car2... | 80 | |
| 10b | CAR | https://www.car3... | 45 | |
| 10b | TRAVEL | https://www.travel1... | 90 | 275 |
| 10b | TRAVEL | https://www.travel2... | 150 | |
| 10b | TRAVEL | https://www.travel3... | 35 | |
| 10b | DANCE | https://www.dance1... | 120 | 694 |
| 10b | DANCE | https://www.dance2... | 150 | |
| 10b | DANCE | https://www.dance3... | 210 | |
| 10b | DANCE | https://www.dance4... | 214 | |

FIG. 4

| PORTABLE DEVICE | SOCIAL MEDIA CHANNEL SUBSCRIPTION INFORMATION/ SOCIAL MEDIA FOLLOW REGISTRATION INFORMATION |
|---|---|
| 1 0 a | TRAVEL CHANNEL |
| 1 0 a | DANCE CHANNEL |
| 1 0 a | COMEDY CHANNEL |
| 1 0 a | COOKING CHANNEL |
| 1 0 a | KARAOKE CHANNEL |
| 1 0 a | ENTERTAINER A |
| 1 0 a | ENTERTAINER B |
| 1 0 a | ENTERTAINER C |
| 1 0 a | ENTERTAINER D |
| 1 0 b | CHANNEL OF SOCCER TEAM A |
| 1 0 b | CHANNEL OF PROFESSIONAL BASEBALL TEAM A |
| 1 0 b | TRAVEL CHANEL |
| 1 0 b | BAND A |
| 1 0 b | BAND B |
| 1 0 b | BASEBALL PLAYER A |
| 1 0 b | SOCCER PLAYER B |
| 1 0 b | ENTERTAINER B |

FIG. 5

VEHICLE

CROSS-REFERENCE TO RELATED APPLICATIONS

The present application claims priority from Japanese Patent Application No. 2022-154270 filed on Sep. 27, 2022, the entire contents of which are hereby incorporated by reference.

BACKGROUND

The disclosure relates to a vehicle.

Recently, vehicles including concierge systems that provide various pieces of beneficial information to drivers or occupants after the vehicle starts moving have been put into practical use. As an example of such concierge systems, Japanese Unexamined Patent Application Publication (JP-A) No. 2006-195578, for example, discloses a technique that provides information regarding recommended places and the like based on a keyword extracted from a conversation between occupants.

SUMMARY

An aspect of the technology provides a vehicle. The vehicle includes a social media information acquisition unit, a collector, a browsing time acquisition unit, an extractor, and a control processor. The social media information acquisition unit is configured to communicate with portable devices of occupants in the vehicle to acquire social media information of the occupants from the portable devices. The collector is configured to collect search keywords from the social media information of the occupants acquired by the social media information acquisition unit. The browsing time acquisition unit is configured to acquire information on browsing time for each of the search keywords from the social media information of the occupants acquired by the social media information acquisition unit. The extractor is configured to extract a common subject based on the search keywords collected from all of the portable devices of the occupants in a communicable state and the information on the browsing time acquired by the browsing time acquisition unit. The control processor is configured to determine content of a proposal to be provided to the occupants in the vehicle based on the common subject extracted by the extractor, and notify the occupants of the content of the proposal.

An aspect of the technology provides a vehicle including circuitry. The circuitry is configured to: communicate with portable devices of occupants in the vehicle to acquire social media information of the occupants from the portable devices; collect search keywords from the social media information of the occupants; acquire information on browsing time for each of the search keywords from the social media information of the occupants; extract a common subject based on the search keywords collected from all of the portable devices of the occupants in a communicable state and the information on the browsing time; determine content of a proposal to be provided to the occupants in the vehicle based on the common subject; and notify the occupants of the content of the proposal.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2 is a table for describing examples of keywords collected by a collector of the vehicle according to the example embodiment of the disclosure.

FIG. 3 is a table for describing examples of browsing time information acquired by a browsing time acquisition unit of the vehicle according to the example embodiment of the disclosure.

FIG. 4 is a table for describing an exemplary browsing time for each search keyword calculated by an extractor of the vehicle according to the example embodiment of the disclosure.

FIG. 5 is a table for describing social media channel subscription information and social media follow registration information acquired by a registration information acquisition unit of the vehicle according to the example embodiment of the disclosure.

DETAILED DESCRIPTION

Figure 1:
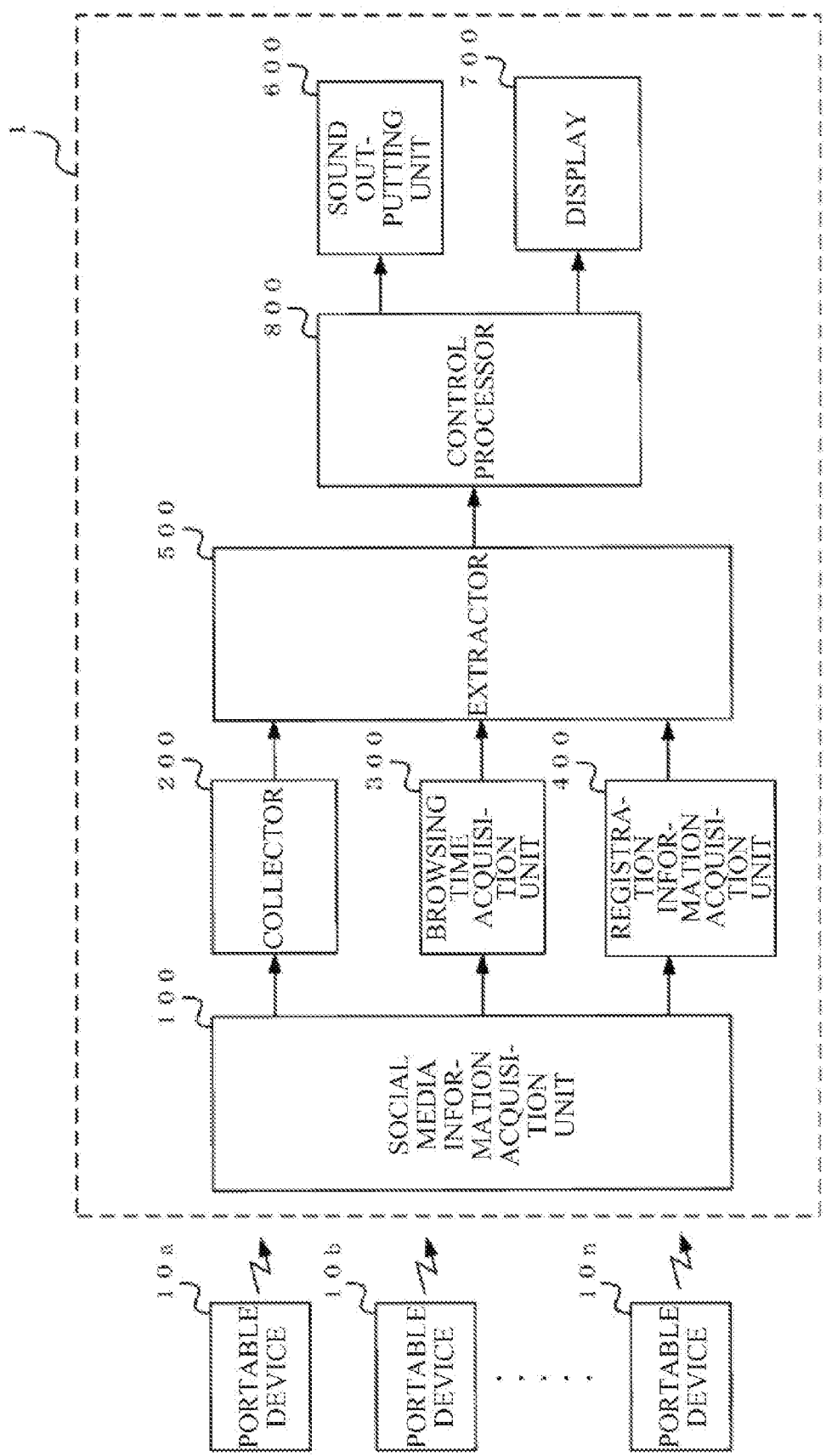
FIG. 1 is a block diagram illustrating a configuration of a vehicle according to one example embodiment of the disclosure.

In a technique disclosed in JP-A No. 2006-195578, the content of information to be provided to occupants of a vehicle is determined based on a keyword extracted from a conversation between the occupants. However, the keyword extracted from the conversation does not necessarily match the tastes and preferences of the occupants, which can cause a problem that the vehicle will provide unbeneficial information to the occupants.

It is desirable to provide a vehicle that makes it possible to provide beneficial information matching the tastes and preferences of occupants of a vehicle.

EXAMPLE EMBODIMENTS

In the following, a vehicle according to an example embodiment of the disclosure is described in detail with reference to FIGS. 1 to 8. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A vehicle 1 according to a first example embodiment is described below with reference to FIGS. 1 to 6.

<Configuration of Vehicle 1>

As illustrated in FIG. 1, the vehicle 1 according to the first example embodiment may include a social media information acquisition unit 100, a collector 200, a browsing time acquisition unit 300, a registration information acquisition unit 400, an extractor 500, a sound outputting unit 600, a display 700, and a control processor 800.

As illustrated in FIG. 1, the social media information acquisition unit 100 communicates with portable devices 10a to 10n owned by occupants of the vehicle 1 to acquire information regarding social media activities (hereinafter simply referred to as social media information) of the occupants from the portable devices 10a to 10n.

Hereinafter, the portable devices 10a to 10n are each referred to as a portable device 10 or collectively referred to as portable devices 10 as appropriate.

Examples of the portable devices 10 may include smartphones and tablets owned by the occupant.

For example, the social media information acquisition unit 100 may communicate with each of the portable devices 10 via a near field communication such as Wi-Fi or Bluetooth to acquire the social media information of the occupants. The social media information acquisition unit 100 may send the social media information of the occupants acquired from the portable devices 10 to the collector 200, the browsing time acquisition unit 300, and the registration information acquisition unit 400 to be described later.

The social media information of the occupant to be acquired by the social media information acquisition unit 100 from the portable devices 10 may include at least search keywords, browsing time information, social media channel subscription information, and social media follow registration information of the occupants.

Before acquiring the social media information of the occupants from the portable devices 10, the social media information acquisition unit 100 may cause each of the portable devices 10 to display a request message to ask the occupant to permit the acquisition of the social media information of the occupant. After confirming an occupant's permission, the social media information acquisition unit 100 may start acquiring the social media information of the occupant.

The collector 200 collects search keywords from the social media information of the occupants acquired from the social media information acquisition unit 100.

In one example, as illustrated in FIG. 2, the collector 200 may collect search keywords inputted to the portable devices 10 upon searching in social media websites from the social media information of the occupants acquired from the social media information acquisition unit 100, and send the collected search keywords to the extractor 500 to be described later.

The browsing time acquisition unit 300 acquires browsing time information for each search keyword from the social media information of the occupants acquired from the social media information acquisition unit 100.

The browsing time information may be a history of browsing of the information relating to the search keywords by the occupants. In one example, as illustrated in FIG. 3, the browsing time acquisition unit 300 may acquire, as the browsing time information, the browsing time for each uniform resource locater (URL) to which the occupant was guided as a result of searching based on a search keyword.

The browsing time acquisition unit 300 may send the browsing time information acquired from the social media information acquisition unit 100 to the extractor 500 to be described later.

The registration information acquisition unit 400 may acquire the social media channel subscription information and the social media follow registration information from the social media information of the occupants acquired from the social media information acquisition unit 100.

In one example, the registration information acquisition unit 400 may acquire the social media channel subscription information and the social media follow registration information regarding favorite channels and favorite users in the social media that the occupants have followed to browse messages and posts in the channels or of the users.

In more detail, as illustrated in FIG. 5, for example, the registration information acquisition unit 400 may acquire social media channel subscription information regarding the names of channels registered in a channel list in YouTube (registered trademark), and social media follow registration information regarding the names of accounts registered in a follow list in Instagram (registered trademark) or Twitter (registered trademark).

The registration information acquisition unit 400 may send the social media channel subscription information and the social media follow registration information to the extractor 500 to be described later.

The extractor 500 extracts a common subject based on the search keywords collected from all of the portable devices 10 of the occupants that the extractor 500 is able to communicate with, and the browsing time information acquired from the portable devices 10.

In one example, the extractor 500 may extract a common subject between the tastes and preferences of the occupants based on the search keywords collected from all of the portable devices 10 of the occupants in communication with the social media information acquisition unit 100 and the browsing time information acquired from the portable devices 10, and may send the result of extraction to the control processor 800 to be described later.

A description is given below of an exemplary method of extracting the common subject using the extractor 500.

The extractor 500 may extract a common word from the search keywords collected from the portable devices 10.

In one example, the extractor 500 may extract an exact match word or a partial match word as the common subject from the collected search keywords.

For example, in a case where search keywords illustrated in FIG. 2 are collected, the extractor 500 may extract an exact match word, "ENTERTAINER A" as the common subject between the portable device 10a and the portable device 10b.

In addition, the extractor 500 may extract partial match words, "TRAVEL" and "DANCE" as the common subjects between the portable device 10a and the portable device 10b.

Further, the extractor 500 may acquire a relevant word which is highly relevant to the search keyword by referring to, for example, a database in which relevant words highly relevant to specific words are stored. If the relevant word exactly or partially matches the search keyword, the extractor 500 may extract the relevant word as the common subject.

Note that the extracting method described above is a non-limiting example, and another extracting method may be employed as long as the common subject between the tastes and preferences of the occupants is detectable.

In a case where the browsing time for a search keyword is longer than or equal to a predetermined time, the extractor 500 may extract the search keyword as the common subject; whereas, in a case where the browsing time for a search keyword is shorter than the predetermined time, the extractor 500 may refrain from extracting the search keyword as the common subject.

For example, in a case where the browsing time for a search keyword is longer than or equal to the predetermined time, it may be estimated that the occupant has an interest in the search keyword.

Accordingly, the extractor 500 may determine whether a search keyword matches the tastes and preferences of the occupants by referring to the browsing time of the occupants.

In one example, as illustrated in FIG. 4, the extractor 500 may calculate a total browsing time for each search keyword. If the total browsing time is longer than or equal to the predetermined time, the extractor 500 may determine that the search keyword matches the tastes and preferences of the occupants, and may output the search keyword as the common subject.

In contrast, if the total browsing time is shorter than the predetermined time, the extractor 500 may determine that the search keyword does not match the tastes and preferences of the occupants, and may refrain from extracting the search keyword as the common subject.

For example, in a case where the total browsing time for each search keyword is shorter than 180 seconds, the extractor 500 may determine that the search keyword does not match the tastes and preferences of the occupants, and may refrain from extracting the search keyword as the common subject.

In the example illustrated in FIG. 4, it seems that an exact match search keyword, "ENTERTAINER A" is to be extracted by the extractor 500 as the common subject; however, the extractor 500 may actually determine that "ENTERTAINER A" does not match the tastes and preferences of the occupants because the time of browsing the information relevant to "ENTERTAINER A" of the occupant using the portable device 10b is 25 seconds, and may refrain from extracting "ENTERTAINER A" as the common subject.

Further, the extractor 500 may extract a common subject from the social media channel subscription information and the social media follow registration information received from the registration information acquisition unit 400.

In one example, the extractor 500 may extract a subscribed channel name and a followed account name that are common between the portable devices 10 of the occupants as common subjects from the information received from the registration information acquisition unit 400, and may send the results of extraction to the control processor 800.

In a case where the extractor 500 receives the social media channel subscription information and the social media follow registration information illustrated in FIG. 5, for example, the extractor 500 may extract "TRAVEL CHANNEL" and "ENTERTAINER B" as common subjects between the portable device 10a and the portable device 10b.

In a case where only one portable device 10 is in communication with the social media information acquisition unit 100 (e.g., in a case where only a driver who drives the vehicle 1 is in the vehicle 1), the extractor 500 may extract a search keyword used for browsing for the predetermined time or longer as the common subject, and may send the search keyword to the control processor 800.

In addition, the extractor 500 may extract the social media channel subscription information and the social media follow registration information acquired from the registration information acquisition unit 400 as common subjects, and may send the results of extraction to the control processor 800.

The sound outputting unit 600 may be, for example, a speaker. The sound outputting unit 600 may output sound data received from the control processor 800 to be described later.

The display 700 may be, for example, a liquid crystal panel. The display 700 may output image data received from the control processor 800 to be described later.

The control processor 800 may control an overall operation of the vehicle 1 in accordance with a control program stored in, for example, a non-illustrated read only memory (ROM).

In the present example embodiment, the control processor 800 may determine, based on the common subjects extracted by the extractor 500, the content of a proposal to be provided to the occupants in the vehicle, and may notify the occupants of the content of the proposal.

For example, the control processor 800 may determine the content of a proposal relevant to the common subjects extracted by the extractor 500, and may notify the occupants of the content of the proposal using the sound outputting unit 600 and the display 700 to be described later.

In more detail, the control processor 800 may acquire the information relevant to the common subjects (e.g., the search keywords, the social media channel subscription information, and the social media follow registration information) extracted by the extractor 500 from a non-illustrated server via the internet.

In a case where the common subject extracted by the extractor 500 is "TRAVEL", for example, information saying "Recommended information on a travel you are all interested in is available. Do you want to check it?" may be outputted as a voice guidance or displayed in the form of a text message on a pop-up window by the control processor 800. After confirming the occupant's intention to check the information, the control processor 800 may notify the information on "TRAVEL" received from the server.

<Process in Vehicle 1>

Figure 6:
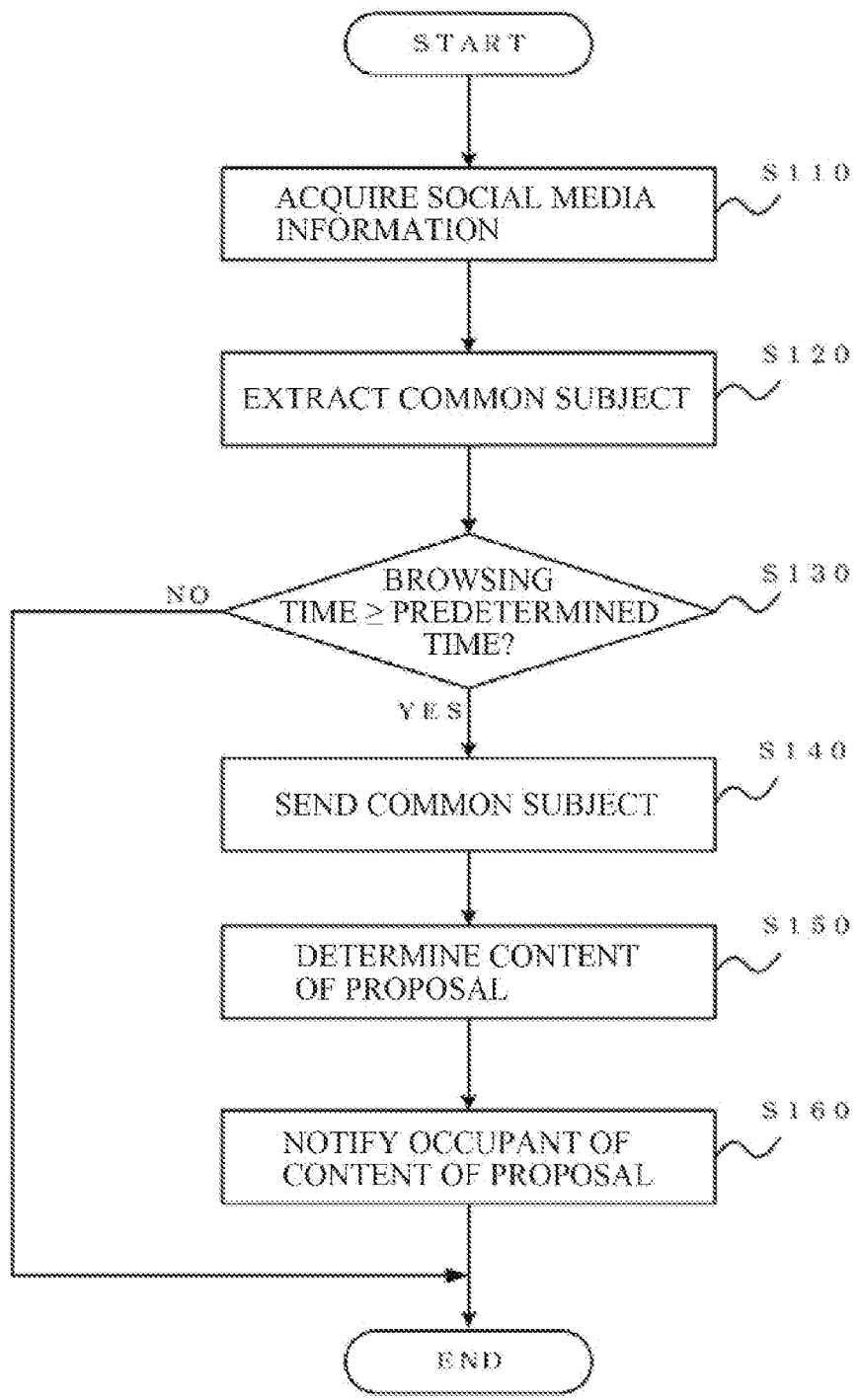
FIG. 6 is a flowchart of a process in the vehicle according to the example embodiment of the disclosure.

An exemplary procedure of the process in the vehicle 1 is described below with reference to FIG. 6.

The social media information acquisition unit 100 may acquire the social media information from all of the portable devices 10 that the social media information acquisition unit 100 is communicable with (Step S110), following which the procedure may proceed to Step S120.

The extractor 500 may extract the common subject from the search keywords collected by the collector 200 (Step S120), following which the procedure may proceed to Step S130.

The extractor 500 may determine whether the browsing time based on the search keyword extracted as the common subject is longer than or equal to the predetermined time (Step S130).

If the extractor 500 determines that the browsing time for the search keyword extracted as the common subject is longer than or equal to the predetermined time (Step S130: YES), the procedure may proceed to Step S140.

In contrast, in a case where the extractor 500 determines that the browsing time for the search keyword extracted as the common subject is shorter than the predetermined time (Step S130: NO), the procedure may end.

If it is determined that the browsing time for the search keyword extracted as the common subject is longer than or equal to the predetermined time (Step S130: YES), the extractor 500 may send the search keyword to the control processor 800 (Step S140), and the procedure may proceed to Step S150.

The control processor 800 may determine the content of a proposal relevant to the search keyword extracted by the extractor 500 (Step S150), following which the procedure may proceed to Step S160.

The control processor 800 may notify the occupants of the content of the proposal determined in Step S150 (Step S160), and the procedure may end.

<Workings and Effects>

As described above, the control processor 800 of the vehicle 1 according to the present example embodiment may determine the content of the proposal to be provided to the occupants in the vehicle based on the search keywords collected by the extractor 500 from the social media information of the occupants, and the common subject between the tastes and preferences of the occupants extracted from the browsing time information regarding the search keywords, and may notify the occupants of the content of the proposal.

Upon the extraction of the common subject between the tastes and preferences of the occupants, in a case where the browsing time for the search keyword is longer than or equal to the predetermined time, the extractor 500 may extract the search keyword as the common subject; however, in a case where the browsing time for the search keyword is shorter than the predetermined time, the extractor 500 may refrain from extracting the search keyword as the common subject.

In general, the search keywords collected from the social media information may include search keywords irrelevant to the tastes and preferences of the occupants. The extractor 500 may thus determine whether each of the collected search keywords matches the tastes and preferences of the occupants based on the browsing time regarding the search keyword, to thereby extract the common subject.

That is, if the browsing time of the occupant regarding a search keyword is shorter than the predetermined time, the extractor 500 may determine that the search keyword is a keyword temporarily used for searching by the occupant, and may exclude the search keyword from candidate words to be extracted as the common subject.

This enables accurate extraction of the common subject matching the tastes and preferences of the occupant. It is therefore possible for the vehicle 1 to provide the occupants of the vehicle 1 with beneficial information matching the tastes and preferences of the occupant.

Further, the extractor 500 may extract a common subject also from the social media channel subscription information and the social media follow registration information of the occupants.

The names of channels subscribed by the occupants and the names of accounts followed by the occupants may be the information indicating the very tastes and preferences of the occupants. The extractor 500 may thus extract the common subject also from the social media channel subscription information and the social media follow registration information.

This allows the content of the proposal to be provided to the occupants to be determined based on the common subject matching the tastes and preferences of the occupants. It is therefore possible for the vehicle 1 to provide the occupants with beneficial information matching the tastes and preferences of the occupants.

Second Example Embodiment

A vehicle 1A according to a second example embodiment is described below with reference to FIGS. 7 and 8. Note that components denoted by the same reference numerals as those of the components in the first example embodiment have the same functions as the components in the first example embodiment, and detailed description thereof is thus omitted.

<Configuration of Vehicle 1A>

Figure 7:
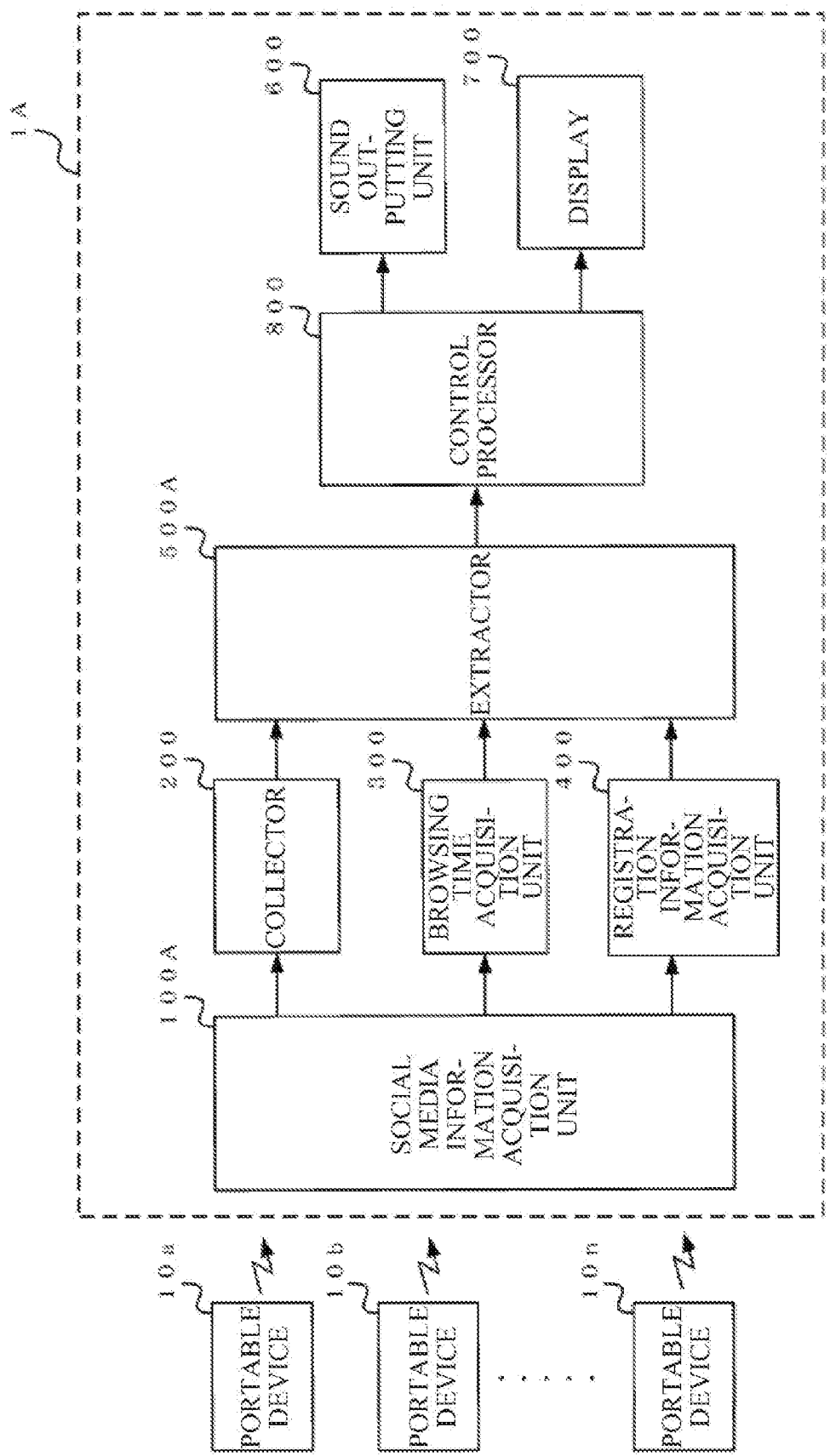
FIG. 7 is a block diagram of a configuration of a vehicle according to one example embodiment of the disclosure.
Figure 8:
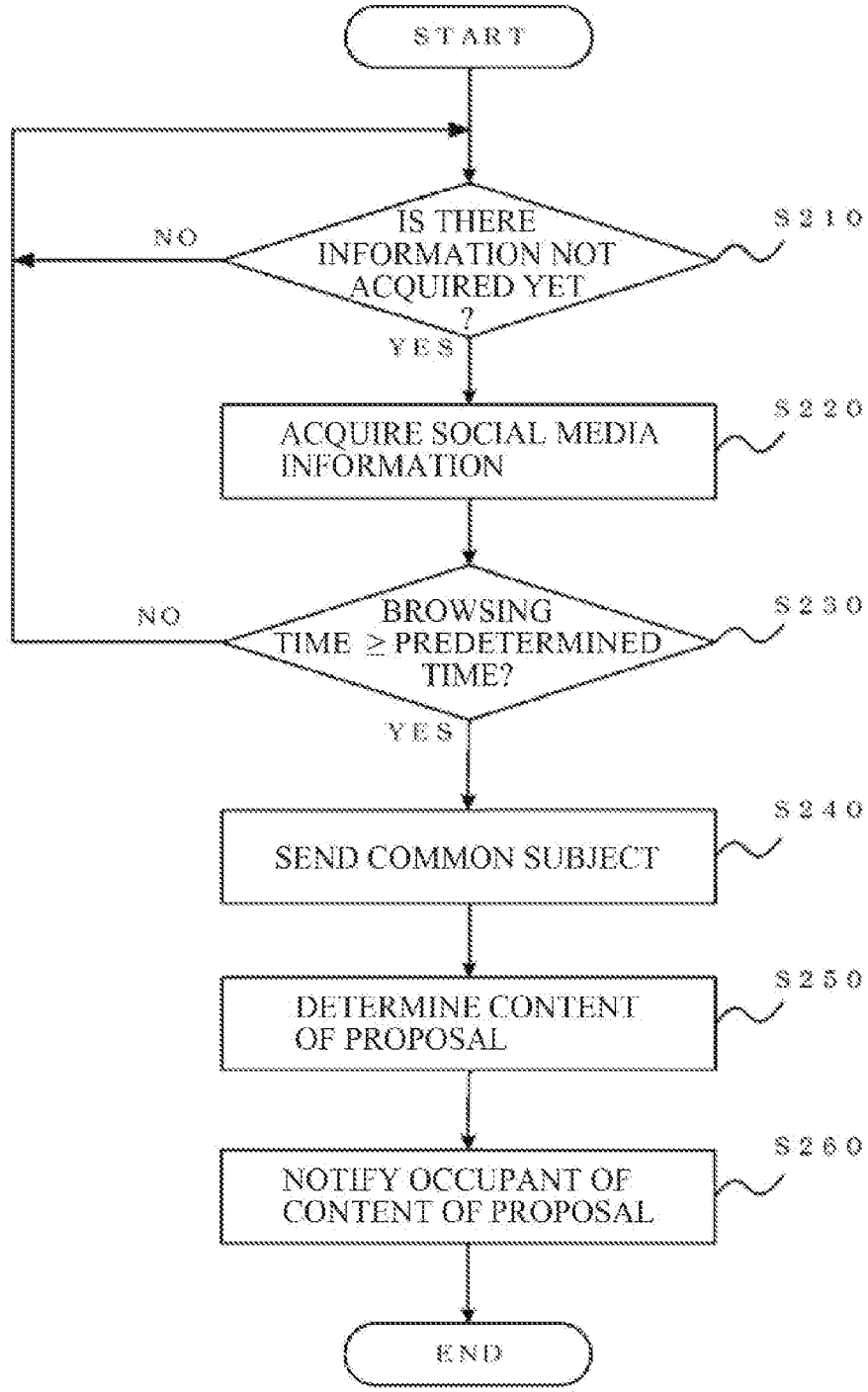
FIG. 8 is a flowchart of a process in a vehicle according to the example embodiment of the disclosure.

As illustrated in FIG. 7, the vehicle 1A according to the second example embodiment may include a social media information acquisition unit 100A, the collector 200, the browsing time acquisition unit 300, the registration information acquisition unit 400, an extractor 500A, the sound outputting unit 600, the display 700, and the control processor 800.

Social media information acquired by the social media information acquisition unit 100A may include real-time information.

For example, in a case where the occupant performs social media searching while the vehicle 1A is traveling, the social media information acquisition unit 100A may acquire the social media information of the occupant from the portable device 10.

In more detail, the social media information acquisition unit 100A may communicate with the portable device 10 to acquire social media information that the social media information acquisition unit 100A has not acquired yet, if any.

That is, the social media information acquisition unit 100A may acquire the information regarding the social media searching performed by the occupant during traveling of the vehicle 1A.

When the same search keyword has been used for browsing for a predetermined time or longer, the extractor 500A may extract the search keyword as the common subject. When different search keywords have been used for browsing within the predetermined time, the extractor 500A may refrain from extracting the search keywords as the common subjects.

For example, in a case where the browsing time for the same search keyword is longer than or equal to the predetermined time, it may be estimated that the occupant has an interest in the search keyword.

The extractor 500A may thus determine whether the search keyword matches the tastes and preferences of the occupants by referring to the browsing time for the same search keyword.

For example, the extractor 500A may acquire the social media information regarding social media searching performed during traveling of the vehicle 1A, including the search keywords and the browsing time for each search keyword, from the collector 200 and the browsing time acquisition unit 300. If it is determined that the browsing time for the same search keyword is 60 seconds or longer, for example, the extractor 500A may extract the search keyword as the common subject.

In other words, in a case where the browsing time for the same search keyword is longer than or equal to the predetermined time, the extractor 500A may determine that the search keyword is a topic of a conversation currently made in the vehicle 1A, may extract the search keyword as the common subject, and may send the search keyword to the control processor 800.

In contrast, if it is determined that different search keywords have been used for browsing within 60 seconds, the extractor 500A may refrain from extracting the search keywords as the common subjects.

<Process in Vehicle 1A>

An exemplary procedure of the process in the vehicle 1A is described below with reference to FIG. 8.

The social media information acquisition unit 100A may determine whether the social media information in the portable device 10 includes information having not been acquired yet by the social media information acquisition unit 100A (Step S210).

If the social media information acquisition unit 100A determines that the social media information in the portable device 10 includes the information having not been acquired yet by the social media information acquisition unit 100A (Step S210: YES), the procedure may proceed to Step S220.

In contrast, if the social media information acquisition unit 100A determines that the social media information in the portable device 10 does not include the information having not been acquired yet by the social media information acquisition unit 100A, the procedure may return to Step S210 in which the procedure returns to a stand-by mode.

If the social media information acquisition unit 100A determines that the social media information in the portable device 10 includes the information having not been acquired yet by the social media information acquisition unit 100A (Step S210: YES), the social media information acquisition unit 100A may acquire the social media information having not been acquired yet (Step S220).

For example, the social media information acquisition unit 100A may acquire the search keyword set by the occupant to perform the social media searching during traveling of the vehicle 1A and the browsing time for the search keyword.

The extractor 500A may determine whether the browsing time for the search keyword acquired by the social media information acquisition unit 100A is longer than or equal to the predetermined time (Step S230).

If the extractor 500A determines that the browsing time for the search keyword acquired by the social media information acquisition unit 100A is longer than or equal to the predetermined time (Step S230: YES), the procedure may proceed to Step S240.

In contrast, if the extractor 500A determines that the browsing time for the search keyword acquired by the social media information acquisition unit 100A is shorter than the predetermined time (Step S230: NO), the procedure may return to Step S210 to thereby continue the process.

When determining that the browsing time for the search keyword acquired by the social media information acquisition unit 100A is longer than or equal to the predetermined time (Step S230: YES), the extractor 500A may extract the search keyword as the common subject, and may send the search keyword to the control processor 800 (Step S240). Thereafter, the procedure may proceed to Step S250.

The control processor 800 may determine the content of a proposal regarding the search keyword received from the extractor 500A (Step S250), following which the procedure may proceed to Step S260.

The control processor 800 may notify the occupant of the content of the proposal determined in Step S230 (Step S260), following which the procedure may end.

<Workings and Effects>

As described above, the social media information acquisition unit 100A of the vehicle 1A according to the present example embodiment may acquire the information regarding the social media searching performed by the occupant during traveling of the vehicle 1A.

For example, when the occupants have an animated conversation about a topic during traveling of the vehicle 1A and perform social media searching for the topic, the social media information acquisition unit 100A may acquire the social media information of the occupants (e.g., search keywords and browsing time) real time from the portable devices 10 of all of the occupants.

In a case where the extractor 500A determines, based on the real-time social media information (including the search keywords and the browsing time) acquired from the portable devices 10, that the browsing time for the same search keyword is longer than or equal to the predetermined time, the extractor 500A may extract the search keyword as the common subject.

For example, in a case where the browsing time for the same keyword is longer than or equal to the predetermined time, it may be estimated that the search keyword is the topic of the current conversation between the occupants in the vehicle 1A.

Accordingly, the extractor 500A may send the search keyword as the common subject to the control processor 800.

This allows the extractor 500A to extract, as the common subject, the search keyword relevant to the topic of the animated conversation currently made between the occupants in the vehicle 1A. It is therefore possible for the vehicle 1A to provide the occupant with beneficial information relevant to the topic at an appropriate timing.

Modification Example 1

The control processor 800 of the vehicle 1 or 1A described above may notify the occupants of information on URLs that is relevant to the common subject extracted by the extractor 500 and that the occupants have browsed.

This allows the occupants to share the information regarding the common subject between the occupants. The occupants are thus able to acquire beneficial information that the occupants have not known.

Further, the control processor 800 may notify the occupants of information that the occupants have not browsed before.

The occupants are thus able to acquire new beneficial information matching the tastes and preferences of the occupants.

Modification Example 2

In the foregoing example embodiments, the control processor 800 of the vehicle 1 or 1A may determine the content of the proposal to be provided to the occupants based on the common subject extracted by the extractor 500, i.e., the common subject matching the tastes and preferences of the occupants. Alternatively, the control processor 800 may determine the content of the proposal based on a vehicle position, calendar information of the occupant, and wearable device information, for example.

For example, based on information on a current position and a destination of the vehicle 1 or 1A, and the common subject extracted by the extractor 500, the control processor 800 may provide the occupants with information on recommended places or shops located near the destination.

Further, based on information on to-dos and to-visits that are registered in calendars of the occupants, and the common subject (e.g., ENTERTAINER A) extracted by the extractor 500, for example, the control processor 800 may provide the occupants with information on shops or the like relevant to the entertainer A and located near the place to visit.

Further, based on biological information and action information of the occupants acquired from wearable devices, and the common subject (e.g., DANCE) extracted by the extractor 500, for example, the control processor 800 may provide the occupants with information on a dance lesson for overcoming inactivity of the occupants, for example.

That is, the control processor 800 may determine the content of the proposal based on the common subject matching the tastes and preferences of the occupants extracted from the social media information, the action schedules of the occupants, the biological information of the occupant, and the action information of the occupant, and may notify the occupants of the content of the proposal. The occupants are thus able to acquire information beneficial in considering future schedules.

Note that it is possible to implement the vehicle 1 or 1A of the example embodiments of the disclosure by recording the processes to be executed by, for example, the extractor 500 and the control processor 800 on a non-transitory recording medium readable by a computer system, and causing, for example, the extractor 500 and the control processor 800 to load the programs recorded on the non-transitory recording medium thereon to execute the programs. The computer system as used herein may encompass an operating system (OS) and hardware such as a peripheral device.

In addition, when the computer system utilizes a World Wide Web (WWW) system, the "computer system" may encompass a website providing environment (or a website displaying environment). The program may be transmitted from a computer system that contains the program in a storage device or the like to another computer system via a transmission medium or by a carrier wave in a transmission medium. The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the social media information acquisition units 100 and 100A, the collector 200, the browsing time acquisition unit 300, the extractors 500 and 500A, and the control processor 800 in FIGS. 1 and 7 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the social media information acquisition units 100 and 100A, the collector 200, the browsing time acquisition unit 300, the extractors 500 and 500A, and the control processor 800. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the social media information acquisition units 100 and 100A, the collector 200, the browsing time acquisition unit 300, the extractors 500 and 500A, and the control processor 800 in FIGS. 1 and 7.

The invention claimed is:

1. A vehicle comprising:
a social media information acquisition unit configured to establish communication with portable devices possessed by occupants in the vehicle, and to acquire, from each portable device, social media activity information representing information derived from user behavior on social networking services;
a collector configured to collect, from the social media activity information, search keywords entered by the occupants when performing searches within the social networking services;
a browsing time acquisition unit configured to acquire, from the social media activity information of the occupants, information indicating a browsing time for each URL (Uniform Resource Locator) representing a web resource that was accessed by one of the occupants as a result of a search using one of the search keywords within one of the social networking services;
an extractor configured to extract at least one common subject based on the search keywords collected from all of the portable devices possessed by the occupants in the vehicle and the information indicating the browsing time acquired by the browsing time acquisition unit; and
a control processor configured to:
determine content of a recommendation associated with the at least one common subject extracted by the extractor; and
output the content of the recommendation to the occupants in the vehicle via an output device.

2. The vehicle according to claim 1, further comprising a registration information acquisition unit configured to acquire, from the social media activity information, social media channel subscription information and social media follow registration information associated with the social networking services for each the occupants,
wherein the extractor is further configured to extract the at least one common subject from the social media channel subscription information and the social media follow registration information.

3. The vehicle according to claim 1, wherein
the social media information of the occupants acquired by the social media information acquisition unit includes real-time search information,
when the same search keyword has been used for browsing for a predetermined time or longer, the extractor extracts the same search keyword as the at least one common subject, and when different search keywords have been used for browsing within the predetermined time, the extractor refrains from extracting the different search keywords as common subjects.

4. The vehicle according to claim 2, wherein the social media information of the occupants acquired by the social media information acquisition unit includes real-time search information, when the same search keyword has been used for browsing for a predetermined time or longer, the extractor extracts the same search keyword as the at least one common subject, and when different search keywords have been used for browsing within the predetermined time, the extractor refrains from extracting the different search keywords as common subjects.

5. The vehicle according to claim 1, wherein the at least one common subject (1) represents a shared area of interest among the occupants in the vehicle, and (2) includes a subject identified when a same search keyword appears in the social media activity information from at least two occupants and cumulative browsing time associated with URLs linked to the search keyword exceeds a predetermined threshold.

6. The vehicle according to claim 5, wherein the browsing time acquisition unit is further configured to calculate the cumulative browsing time associated with each search keyword by summing the browsing times for all URLs linked to that search keyword and accessed by the occupants.

7. A vehicle comprising circuitry configured to:

establish communication with portable devices possessed by occupants in the vehicle, and acquire, from each portable device, social media activity information representing information derived from user behavior on social networking services;

collect, from the social media activity information, search keywords entered by the occupants when performing searches within the social networking services;

acquire, from the social media activity information of the occupants, information indicating browsing time for each URL (Uniform Resource Locator) representing a web resource that was accessed by one of the occupants as a result of a search using one of the search keywords within one of the social networking services;

extract at least one common subject based on the search keywords collected from all of the portable devices possessed by the occupants in the vehicle and the information indicating the browsing time;

determine content of a recommendation associated with the at least one common subject; and output the content of the recommendation to the occupants in the vehicle via an output device.

8. The vehicle according to claim 7, wherein the at least one common subject (1) represents a shared area of interest among the occupants in the vehicle, and (2) includes a subject identified when a same search keyword appears in the social media activity information from at least two occupants and cumulative browsing time associated with URLs linked to the search keyword exceeds a predetermined threshold.

9. The vehicle according to claim 8, wherein the circuitry is further configured to calculate the cumulative browsing time associated with each search keyword by summing the browsing times for all URLs linked to that search keyword and accessed by the occupants.

* * * * *